(12) United States Patent
Chang (10) Patent No.: US 11,263,723 B2
(45) Date of Patent: Mar. 1, 2022

(54) IMAGE WARPING METHOD AND DEVICE

(71) Applicant: BEIJING BAIDU NETCOM SCIENCE TECHNOLOGY CO., LTD., Beijing (CN)

(72) Inventor: Yuanzhang Chang, Beijing (CN)

(73) Assignee: BEIJING BAIDU NETCOM SCIENCE TECHNOLOGY CO., LTD.

(*) Notice: Subject to any disclaimer, the term of this patent is extended or adjusted under 35 U.S.C. 154(b) by 261 days.

(21) Appl. No.: 16/666,795

(22) Filed: Oct. 29, 2019

(65) Prior Publication Data

US 2020/0242728 A1 Jul. 30, 2020

(30) Foreign Application Priority Data

Jan. 25, 2019 (CN) .......................... 201910073701.0

(51) Int. Cl.
*G06T 3/00* (2006.01)
*G06T 3/20* (2006.01)
*G06T 3/40* (2006.01)

(52) U.S. Cl.
CPC .............. *G06T 3/0093* (2013.01); *G06T 3/20* (2013.01); *G06T 3/40* (2013.01)

(58) Field of Classification Search
None
See application file for complete search history.

(56) References Cited

U.S. PATENT DOCUMENTS 6,208,360 B1 * 3/2001 Doi .......................... G06T 13/80
345/474
10,095,917 B2 * 10/2018 Taigman .............. G06N 3/0454
(Continued)

FOREIGN PATENT DOCUMENTS

JP 2011053942 A 3/2011
KR 0764130 B 9/2007
KR 20170047167 A 5/2017

OTHER PUBLICATIONS

Dairbo, Ismael et al., Distance Dependent Depty Filtering in 3D Warping for 3DTV, Ecole Nationale Superieure des Telecommunications (ENST), 2007 IEEE, pp. 312-315.
(Continued)

*Primary Examiner* — Anand P Bhatnagar
(74) *Attorney, Agent, or Firm* — Dilworth IP, LLC (57) ABSTRACT

The present disclosure provides an image warping method and an image warping device, including: obtaining an image or a video; identifying at least one target portion of a to-be-warped portrait in the image or the video; and performing a warping process on the target portion using a preset warping algorithm, where the warping process includes one or more of the following processes: enlarging, narrowing down, or shifting. In this way, a portrait in the image or the video can be beautified automatically, without a manual beautification of the image from a user, making the beautification more intelligent and simpler, thereby improving the user experience. Moreover, according to the method of the present disclosure, a warping process can be performed on an image or a video online in real time, or performed on a stored image or a stored video offline, allowing the image warping method to be more widely used.

15 Claims, 2 Drawing Sheets

(56) References Cited

U.S. PATENT DOCUMENTS

| | | | | |
|---|---|---|---|---|
| 10,101,891 | B1* | 10/2018 | Kulewski | G06F 3/04845 |
| 10,324,605 | B2* | 6/2019 | Matsuda | G06F 3/04847 |
| 10,810,700 | B2* | 10/2020 | Lu | H04N 5/23238 |
| 11,055,381 | B1* | 7/2021 | Hart | G06F 17/10 |
| 2010/0054620 | A1* | 3/2010 | Kobayashi | G06T 3/0093 |
| | | | | 382/256 |
| 2010/0124371 | A1* | 5/2010 | Jiang | G06T 3/0093 |
| | | | | 382/162 |
| 2011/0090303 | A1* | 4/2011 | Wu | H04N 5/23267 |
| | | | | 348/14.16 |
| 2013/0039599 | A1* | 2/2013 | Aoki | G06T 3/0093 |
| | | | | 382/276 |
| 2015/0248743 | A1* | 9/2015 | Yoon | H04N 5/23293 |
| | | | | 345/660 |
| 2016/0328825 | A1 | 11/2016 | Yu | |
| 2019/0139296 | A1* | 5/2019 | Lakshman | G06T 15/08 |

OTHER PUBLICATIONS

First Office Action in EP Patent Application No. 19211028.6 dated May 21, 2021.
Decision of Refusal in KR Patent Application No. 2019-0152399 dated Apr. 29, 2021.
Barrett, W. A. et al., Object-Based Image Editing, Association for Computing Machinery, Inc., 2002, pp. 777-784.
Office Action in KR Patent Application No. 20190152399 dated Oct. 27, 2020.
Barrett, William A., et al.; Object-Based Image Editing; Department of Computer Science, Brigham Young University, Association for Computing Machinery, Inc.; 2002; pp. 777-784.
European Search Report issued in Application No. 19211928.6 dated May 4, 2020.
First Office Action in JP Patent Application No. 2019200536 dated Dec. 22, 2020.

* cited by examiner

IMAGE WARPING METHOD AND DEVICE

CROSS-REFERENCE TO RELATED APPLICATIONS

This application claims priority to Chinese Patent Application No. 201910073701.0, filed on Jan. 25, 2019, which is hereby incorporated by reference in its entirety.

TECHNICAL FIELD

The present disclosure relates to the field of image processing technologies, and in particular, to an image warping method and an image warping device.

BACKGROUND

In daily life, people are accustomed to taking pictures and shooting videos with portable devices such as mobile phones, tablets or cameras to record wonderful moments in their lives. Images and videos bring great convenience and joy to people's life, social and work.

In prior art, an image processing software (such as Photoshop, ACDSee, Meitu Xiuxiu, etc.) is usually used for beautifying an image in real-time or offline to get the image more attractive, for example, by performing a beautifying process like face-lifting, leg-slimming, height-increasing, etc. When the image processing software is used to process the image, repeated manual adjustments are required for the part of the image to be beautified, so as to achieve a satisfactory result.

Conventional image beautification methods cost a lot of time, and the beautification process is cumbersome.

SUMMARY

The present disclosure provides an image warping method and an image warping device, which can automatically beautify a portrait in an image or a video. The beautification manner is more intelligent and simpler, thereby improving user experience.

A first aspect of the present disclosure provides an image warping method, including:

obtaining an image or a video;

identifying at least one target portion of a to-be-warped portrait in the image or the video; and performing a warping process on the target portion using a preset warping algorithm, where the warping process includes one or more of the following processes: enlarging, narrowing down, or shifting.

Optionally, the identifying at least one target portion of a to-be-warped portrait in the image or the video includes:

identifying the to-be-warped portrait in the image or in each frame or a key frame of the video;

extracting contour points of the target portion of the to-be-warped portrait; and the performing the warping process on the target portion using the preset warping algorithm includes:

performing the warping process using the warping algorithm on the region where the contour points of the target portion are located.

Optionally, the identifying at least one target portion of a to-be-warped portrait in the image or the video includes:

identifying the to-be-warped portrait in the image or in each frame or a key frame of the video; and dividing the to-be-warped portrait to obtain the target portion.

Optionally, the performing a warping process on the target portion using a preset warping algorithm includes:

dividing the image or the video into a two-dimensional grid;

performing a warping calculation on pixel points located at vertices of the two-dimensional grid in the target portion by using the warping algorithm to obtain position information of the pixel points at the vertices of the two-dimensional grid after warping;

performing, according to position information of the pixel points at the vertices of the two-dimensional grid before and after the warping, an interpolation calculation on other pixel points other than the pixel points at the vertices of the two-dimensional grid in the target portion to obtain position information of the other pixel points after the warping;

filling a position after the warping with a pixel value of each pixel point of the target portion.

Optionally, when performing a process of narrowing down on the target portion in the image, the method further includes:

separating a portrait and a background area in the image by using a background segmentation technology;

filling a blank area formed after the narrowing down of the target portion according to a pixel value of the background area; or performing a warping process on the background area using the warping algorithm to enlarge the background area, where the enlarged area is used to fill the blank area formed after the narrowing down of the target portion.

Optionally, when performing a process of narrowing down on the target portion in the video, the method further includes:

separating a portrait and a background area of each frame of image in a plurality of frames of image included in the video by using a background segmentation technology;

filling a blank area formed after the narrowing down of the target portion according to a pixel value of the background area of the plurality of frames of image; or performing a warping process on the background area of each frame of image using the warping algorithm to enlarge the background area of each frame of image, where the enlarged area is used to fill the blank area formed after the narrowing down of the target portion.

Optionally, before the performing the warping process using the warping algorithm on the region where the contour points of the target portion are located, the method further includes:

performing a smoothing process on contour points of a same target portion extracted from a plurality of frames of image included in the video.

Optionally, after the performing a warping process on the target portion using a preset warping algorithm, the method further includes:

performing a smoothing process on a warping result of a same target portion in a plurality of frames of image included in the video.

Optionally, the obtaining an image or a video includes:

shooting the image or the video using a camera; or obtaining the image or the video from a storage space.

A second aspect of the present disclosure provides an image warping device, including:

an obtaining module, configured to obtain an image or a video;

an identifying module, configured to identify at least one target portion of a to-be-warped portrait in the image or the video; and a warping module, configured to perform a warping process on the target portion using a preset warping algorithm, where the warping process includes one or more of the following processes: enlarging, narrowing down, or shifting.

Optionally, the identifying module is specifically configured to:

identify the to-be-warped portrait in the image or in each frame or a key frame of the video;

extract contour points of the target portion of the to-be-warped portrait; and the warping module is specifically configured to:

perform the warping process using the warping algorithm on the region where the contour points of the target portion are located.

Optionally, the identifying module is specifically configured to:

identify the to-be-warped portrait in the image or in each frame or a key frame of the video; and divide the to-be-warped portrait to obtain the target portion.

Optionally, the warping module is specifically configured to:

divide the image or the video into a two-dimensional grid;

perform a warping calculation on pixel points located at vertices of the two-dimensional grid in the target portion by using the warping algorithm to obtain position information of the pixel points at the vertices of the two-dimensional grid after warping;

perform, according to position information of the pixel points at the vertices of the two-dimensional grid before and after the warping, an interpolation calculation on other pixel points other than the pixel points at the vertices of the two-dimensional grid in the target portion to obtain position information of the other pixel points after the warping;

fill a position after the warping with a pixel value of each pixel point of the target portion.

Optionally, the device further includes:

a separating module, configured to separate a portrait and a background area in the image by using a background segmentation technology when a process of narrowing down is performed by the warping module on the target portion in the image;

a filling module, configured to fill a blank area formed after the narrowing down of the target portion according to a pixel value of the background area; or perform a warping process on the background area using the warping algorithm to enlarge the background area, where the enlarged area is used to fill the blank area formed after the narrowing down of the target portion.

Optionally, the device further includes:

a separating module, configured to separate a portrait and a background area of each frame of image in a plurality of frames of image included in the video by using a background segmentation technology when a process of narrowing down is performed by the warping module on the target portion in the video;

a filling module, configured to fill a blank area formed after the narrowing down of the target portion according to a pixel value of the background area of the plurality of frames of image; or perform a warping process on the background area of each frame of image using the warping algorithm to enlarge the background area of each frame of image, where the enlarged area is used to fill the blank area formed after the narrowing down of the target portion.

Optionally, the device further includes:

a smoothing module, configured to perform a smoothing process on contour points of a same target portion extracted from a plurality of frames of image included in the video.

Optionally, the device further includes:

a smoothing module, configured to perform a smoothing process on a warping result of a same target portion in a plurality of frames of image included in the video.

Optionally, the obtaining module is specifically configured to:

shoot the image or the video using a camera; or obtain the image or the video from a storage space.

A third aspect of the present disclosure provides an electronic device, including a processor, a memory and a transceiver, where the memory is configured to store instructions, the transceiver is configured to communicate with a further device, and the processor is configured to execute the instructions stored in the memory to cause the electronic device to perform the method according to the first aspect or any one of the alternative implementations of the present disclosure.

A fourth aspect of the present disclosure provides a computer readable storage medium, where the computer readable storage medium stores instructions that, when executed, cause a computer to perform the method according to the first aspect or any one of the alternative implementations of the present disclosure.

The image warping method and the image warping device provided by the present disclosure include: obtaining an image or a video; identifying at least one target portion of a to-be-warped portrait in the image or the video; and performing a warping process on the target portion using a preset warping algorithm, where the warping process includes one or more of the following processes: enlarging, narrowing down, or shifting. In this way, a portrait in the image or the video can be beautified automatically, without a manual beautification of the image from a user, making the beautification more intelligent and simpler, thereby improving the user experience. Moreover, according to the method of the present disclosure, a warping process can be performed on an image or a video online in real time, or performed on a stored image or a stored video offline, allowing the image warping method to be more widely used.

BRIEF DESCRIPTION OF DRAWINGS

The accompanying drawings, which are incorporated herein to construct a part of the description, show embodiments of the present disclosure, and are used to illustrate principles of the present disclosure in conjunction with the description.

Specific embodiments of the present disclosure are shown in the foregoing drawings and are described in detail herein. The drawings and the description are not intended to limit the scope of the present disclosure in any way, but to illustrate concepts of the present disclosure to those of ordinary skill in the art with reference to the specific embodiments.

DESCRIPTION OF EMBODIMENTS

To make objectives, technical solutions and advantages of the present disclosure clearer, the technical solutions of the embodiments of the present disclosure are clearly and thoroughly described in the following with reference to the accompanying drawings of the embodiments of the present disclosure. It is apparent that the embodiments described herein are merely a part of, rather than all of, the embodiments of the present disclosure. All other embodiments obtained by those of ordinary skill in the art based on the embodiments of the present disclosure without paying creative efforts shall fall within the scope of the present disclosure.

Figure 1:
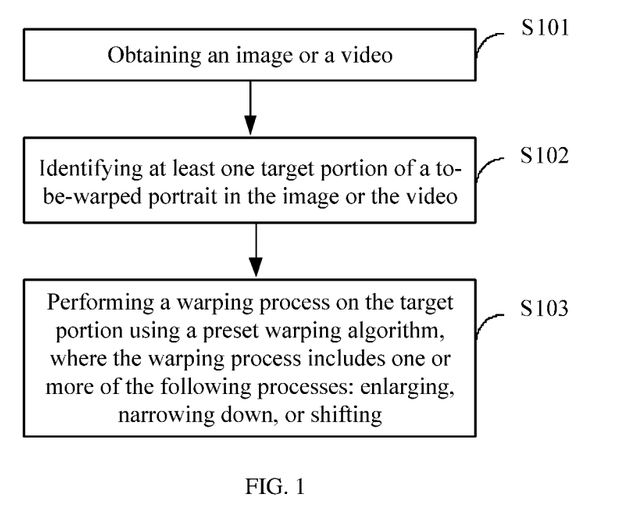
FIG. 1 is a flowchart of an image warping method according to Embodiment 1 of the present disclosure.

FIG. 1 is a flowchart of an image warping method according to Embodiment 1 of the present disclosure. The method according to the embodiment can be applied to an electronic device that is capable of presenting an image or playing a video, which can be a personal computer, a tablet computer, a mobile phone, or an in-vehicle device and the like. As shown in FIG. 1, the method provided in the embodiment includes the following steps:

Step S101: obtaining an image or a video.

The image or the video may be taken by the electronic device in real time through a camera, or may be sent to the electronic device by a further electronic device in real time, for example, a video of the other side transmitted by a video device from the other side during a video call. Therefore, according to the method of the embodiment, a warping process can be performed on the image or the video in real time online.

It may also be an image or a video pre-stored in the electronic device, and the electronic device reads the to-be-processed image or video from the storage device. The image or the video pre-stored in the electronic device may be taken and stored by the camera of the electronic device, or may be transmitted to the electronic device from a further electronic device. Therefore, according to the method of the embodiment, a warping process can also be performed on an offline image or video.

Step S102: identifying at least one target portion of a to-be-warped portrait in the image or the video.

The at least one target portion includes, but is not limited to, a portion of the portrait such as a leg, a waist, a face, an eye, an arm, and the like. It can be configured in advance by a system or can be specified by a user that which part of the portrait needs to be warped.

The at least one target portion of the to-be-warped portrait in the image or the video may be identified by the following manners:

Manner 1: identifying the to-be-warped portrait in the image or in each frame or a key frame of the video; and extracting contour points of the target portion of the to-be-warped portrait.

It can be understood that an image or a video may include multiple portraits, and a warping process can be performed on each portrait in the image or the video. It is also possible to warp only part of key portraits in the image or the video. Therefore, it is necessary to determine the to-be-warped portrait from the image or the video.

In an exemplary way, when multiple portraits are included in the image or the video, the to-be-warped portrait may be determined according to a size of a portrait area, for example, a portrait with a portrait area larger than a preset first threshold is determined as the to-be-warped portrait. If the area occupied by the portrait itself is small, the warping effect of the target portion of the portrait may not be obvious. Of course, the to-be-warped portrait can also be determined in other ways, which will not be described herein.

An approach of machine learning may be employed to extract the contour points of the target portion of the portrait in the image, where the approach of machine learning may be a deep learning method. Of course, it is not limited to the approach of machine learning, an existing contour point extraction algorithm can also be used to extract the contour points.

As to the video, since a plurality of frames of image are included in the video, contour points of the target portion of the portrait in each frame of image may be extracted separately, or only contour points of the target portion of the portrait in the key frame of the video may be extracted. In the embodiment, the key frame refers to a frame in which a key motion during the moving or changing of the portrait is located, and a software may be used to create an animation between key frames, which is called a transition frame or an intermediate frame.

The method for extracting contour points of a target portion from an image in a video frame is the same as the method used for the case of an image, where details are not described herein again.

Manner 2: identifying the to-be-warped portrait in the image or in each frame or a key frame of the video; and dividing the to-be-warped portrait to obtain the target portion.

An existing portrait segmentation algorithm can be used to segment the portrait to obtain various portions of the portrait, thereby obtaining the target portion.

Manner 3: identifying a portrait in an image or in each frame or a key frame of a video, where the portrait as a whole is taken as a target portion.

It should be noted that since acts of the portrait in different images or the video are different, a target portion of the portrait that can be identified in different images or the video are also different.

Assume that the following six target portions are predefined: legs, a waist, a face, eyes, arms, and a chest. When a portrait is merely captured with the back of a person, only the legs, waist and arms can be identified, and the face, eyes and chest of the portrait are not identified. When a person of a portrait looks down, the face and glasses of the person are also not identified. When a portrait is only captured with the head (such as a selfie) or the upper body of a person, the legs and waist of the portrait are not identified.

Step S103: performing a warping process on the target portion using a preset warping algorithm, where the warping process includes one or more of the following processes: enlarging, narrowing down, or shifting.

Image warping refers to the warping of an image into a specific shape, enlarging, narrowing down, shifting, and a combination of operations is performed on the image as a whole or a part of the image. The warping algorithm may be moving least squares, mean value coordinates, and the like.

An image can be considered as a collection of many pixel points Image warping can be understood as transforming the position of a pixel.

When the contour points of the target portion are extracted in step S102, the warping process may be performed on a region where the contour points of the target portion are located by using the warping algorithm.

In the embodiment, one or more of the following warping processes is performed on the target portion using the warping algorithm: enlarging, narrowing down, or shifting. When there are multiple target portions, the warping process for different target portions may be different.

For example, a warping process for a leg includes enlargement in a longitudinal direction and narrowing down in a lateral direction, where the enlargement of the leg in the longitudinal direction achieves an effect of elongating the leg, and the narrowing down of the leg in the lateral direction achieves an effect of leg-slimming of the leg.

Similarly, a warping process for an arm includes enlargement in the longitudinal direction and narrowing down in the lateral direction to achieve an effect of arm-slimming and elongating the arm.

As another example, a warping process for an eye includes enlarging the eye. A warping process for a face includes narrowing down the face to achieve an effect of face-lifting. A warping process for a waist includes narrowing down the waist in the longitudinal direction to achieve an effect of waist-slimming A warping process for the chest includes enlargement of the chest to achieve an effect of breast enhancement.

The above example is described by taking a warping process of a target portion in partial of a portrait as an example. The warping process can also be performed on the portrait by taking the entire portrait as a target portion. One or more of the following warping processes may be performed on the entire portrait: enlarging the portrait in the longitudinal direction proportionally to achieve an effect of height-increasing; narrowing down the portrait in the horizontal direction to achieve an effect of body-slimming; shifting the portrait as a whole to move the portrait to a specified position in the image.

When a warping process is performed on a target portion, it is necessary to perform a warping calculation on all pixel points of the target portion, where the calculation amount is large. Optionally, the following manner can be used to quicken a warping of an image:

dividing the image or the video into a two-dimensional grid; performing a warping calculation on pixel points located at vertices of the two-dimensional grid in the target portion by using the warping algorithm to obtain position information of the pixel points at the vertices of the two-dimensional grid after warping; performing, according to position information of the pixel points at the vertices of the two-dimensional grid before and after the warping, an interpolation calculation on other pixel points other than the pixel points at the vertices of the two-dimensional grid in the target portion to obtain position information of the other pixel points after the warping; and filling a position after the warping with a pixel value of each pixel point of the target portion. Then a complete warping result of the target portion can be obtained.

Optionally, a rectangular grid is generally used, and pixel points of each vertex of the grid are solved by an image warping algorithm to obtain a position difference (that is, a coordinate difference) between a position before warping and a position after warping, so that position differences for pixel points located at other positions of the grid can be calculated through a bilinear interpolation. As a result, positions of all the pixel points of the target portion after warping can be solved to update the target portion.

The position information of a pixel point mentioned above refers to a coordinate value of the pixel point, and the position difference is the difference between the coordinate values before and after the warping.

The size of the mesh in the two-dimensional grid can be pre-defined, and the size of the mesh needs to be moderated to achieve an effect of quickening warping without affecting the warping effect. Since only the pixel points at the vertices of the two-dimensional grid need to be warped, the interpolation calculation is performed on other pixel points of the target portion to obtain a warping result, thereby reducing the calculation amount of the warping calculation and quickening the warping process.

A warping result is obtained by performing a warping calculation on the pixel points at the vertices of the two-dimensional grid, where the warping result is positions of the pixels at the vertices of the two-dimensional grid after being warped in the image. The interpolation calculation is performed on other pixel points in the target portion to obtain a warping result.

When performing narrowing down on the target portion in the image, a blank area is formed after the target portion is narrowed down, and the blank area needs to be filled. Optionally, the portrait and background area in the image can be separated by using a background segmentation technology; the blank area formed after the narrowing down of the target portion is filled according to a pixel value of the background area.

Optionally, a warping process can be performed on the background area using the warping algorithm to enlarge the background area, where the enlarged area is used to fill the blank area formed after the narrowing down of the target portion. The warping algorithm used in the warping of the target portion and the background area may be the same or different, which is not limited in the embodiment.

Optionally, a filling pixel may be generated according to a pixel value in the background of the image that is close to the target portion, the blank area is then filled with the filling pixel, where the filling pixel should enable the blank area to be merged with other background.

When performing narrowing down on the target portion in the video, a blank area is formed after the target portion is narrowed down. As to the video, a portrait and a background area of each frame of image in a plurality of frames of image included in the video are separated by using a background segmentation technology. In this manner, a filling pixel can be generated by combining pixel values of the background area in the plurality of frames of image to fill the blank area formed after the narrowing down of the target portion. If the background area of the plurality of frames of image is the same, the filling pixel may be calculated only once.

Optionally, a warping process can also be performed on the background area of each frame of image by using the warping algorithm to enlarge the background area of each frame of image, where the enlarged area is used to fill the blank area formed after the narrowing down of the target portion. The warping algorithm used in the warping of the target portion and the background area may be the same or different, which is not limited in the embodiment.

When the plurality of frames of image included in the video is warped frame by frame, the video can be smoothed in the following two ways so as to achieve the continuity of the video after the warping, for example, to achieve an effect without jitter and discontinuity:

(1) Performing a smoothing process on contour points of the same target portion extracted from the plurality of frames of image included in the video.

The contour points of the same target portion generally have little change in continuous plurality of frames of image. If a position of one or positions of several contour points in the target portion of the extracted frame of image is or are larger than that in the adjacent previous and later frames of image, optionally, the contour points of the first few frames may be used as a constraint to perform a smooth calculation to obtain a new contour point, and the calculated new contour point should make the variations between frames to be relatively small and smooth as much as possible. Of course, the contour points can be smoothed by other smoothing methods as long as the continuity of the contour points between frames can be ensured.

(2) Performing a smoothing process on a warping result of the same target portion in the plurality of frames of image included in the video.

Optionally, a constraint relationship between the frames may be utilized to ensure that objects in the background remain continuity between the frames as much as possible, and that stationary objects remain stationary, and a motion of a moving object is relatively smooth. The region where the image is warped is filled according to a relationship between frames or a relationship between successive frames, thus making the continuity between frames of the warping result better.

According to the method of the embodiment, a warping process can be performed completely or partially on a portrait in an image or a video to make the portrait to be more beautiful. The method can process pictures or videos in real time. For example, when a user opens the camera to take a photo, a portrait will appear in the preview box. At this time, the portrait in the preview box can be beautified, and a warped portrait can be seen by the user through the preview box. The user can adjust his or her own stance for taking a photo until he/she is satisfied, then click the camera button to take a photo, where the image obtained by the camera is a warped image.

Optionally, the image may be warped after taking and before storing the photo. In this way, the stored image is an image after warping.

Optionally, stored photos can also be warped offline.

Since the method of the embodiment can process the video in real time, it can be applied to applications for live broadcasting, and can also be applied to a social software with the function of video call. The user can perform a warping process on an image shown in the video call during a video call made by the social software.

The method of the embodiment can also perform offline processing on the video to make a special effect of film and television.

In the embodiment, an image or a video is obtained; at least one target portion of a to-be-warped portrait in the image or the video is identified; and a warping process is performed on the target portion using a preset warping algorithm, where the warping process includes one or more of the following processes: enlarging, narrowing down, or shifting. In this way, a portrait in the image or the video can be beautified automatically, without a manual beautification of the image from a user, making the beautification more intelligent and simpler, thereby improving the user experience. Moreover, according to the method of the present disclosure, a warping process can be performed on an image or a video online in real time, or performed on a stored image or a stored video offline, allowing the image warping method to be more widely used.

Figure 2:
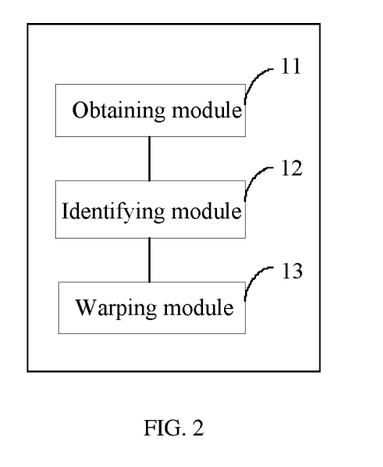
FIG. 2 is a schematic structural diagram of an image warping device according to Embodiment 2 of the present disclosure.

FIG. 2 is a schematic structural diagram of an image warping device according to Embodiment 2 of the present disclosure. As shown in FIG. 2, the device provided in the embodiment includes:

an obtaining module 11, configured to obtain an image or a video;

an identifying module 12, configured to identify at least one target portion of a to-be-warped portrait in the image or the video; and a warping module 13, configured to perform a warping process on the target portion using a preset warping algorithm, where the warping process includes one or more of the following processes: enlarging, narrowing down, or shifting.

Optionally, the identifying module 12 is specifically configured to:

identify the to-be-warped portrait in the image or in each frame or a key frame of the video;

extract contour points of the target portion of the to-be-warped portrait; and the warping module 13 is specifically configured to:

perform the warping process using the warping algorithm on a region where the contour points of the target portion are located.

Optionally, the identifying module 12 is specifically configured to:

identify the to-be-warped portrait in the image or in each frame or a key frame of the video; and divide the to-be-warped portrait to obtain the target portion.

Optionally, the warping module 13 is specifically configured to:

divide the image or the video into a two-dimensional grid;

perform a warping calculation on pixel points located at vertices of the two-dimensional grid in the target portion by using the warping algorithm to obtain position information of the pixel points at the vertices of the two-dimensional grid after warping;

perform, according to position information of the pixel points at the vertices of the two-dimensional grid before and after the warping, an interpolation calculation on other pixel points other than the pixel points at the vertices of the two-dimensional grid in the target portion to obtain position information of the other pixel points after the warping;

fill a position after the warping with a pixel value of each pixel point of the target portion.

Optionally, the obtaining module 14 is specifically configured to:

shoot the image or the video using a camera; or obtain the image or the video from a storage space.

Figure 3:
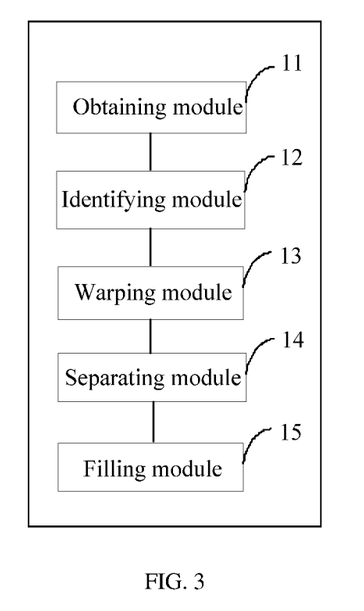
FIG. 3 is a schematic structural diagram of an image warping device according to Embodiment 3 of the present disclosure.

FIG. 3 is a schematic structural diagram of an image warping device according to Embodiment 3 of the present disclosure. As shown in FIG. 3, the device of the present embodiment further includes:

a separating module 14, configured to separate a portrait and a background area in the image by using a background segmentation technology when a process of narrowing down is performed by the warping module on the target portion in the image;

a filling module 15, configured to fill a blank area formed after the narrowing down of the target portion according to a pixel value of the background area; or perform a warping process on the background area using the warping algorithm to enlarge the background area, where the enlarged area is used to fill the blank area formed after the narrowing down of the target portion.

Alternatively, the separating module 14 is configured to separate a portrait and a background area of each frame of image in a plurality of frames of image included in the video by using a background segmentation technology when a process of narrowing down is performed by the warping module on the target portion in the video;

the filling module 15 is configured to fill a blank area formed after the narrowing down of the target portion according to a pixel value of the background area of the plurality of frames of image; or perform a warping process on the background area of each frame of image using the warping algorithm to enlarge the background area of each frame of image, where the enlarged area is used to fill the blank area formed after the narrowing down of the target portion.

Optionally, the device further includes:

a smoothing module, configured to perform a smoothing process on contour points of a same target portion extracted from a plurality of frames of image included in the video.

Optionally, the device further includes:

a smoothing module, configured to perform a smoothing process on a warping result of a same target portion in a plurality of frames of image included in the video.

The device in the foregoing embodiment can be used to perform the method in the first embodiment. The specific implementation and the technical effects are similar, where details are not described herein again.

Figure 4:
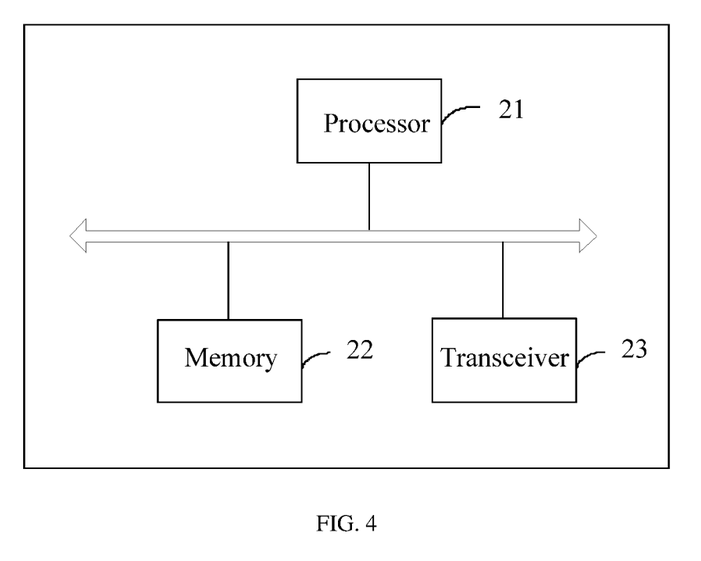
FIG. 4 is a schematic structural diagram of an electronic device according to Embodiment 4 of the present disclosure.

FIG. 4 is a schematic structural diagram of an electronic device according to Embodiment 4 of the present disclosure. As shown in FIG. 4, the electronic device 200 provided in the embodiment includes a processor 21, a memory 22, and a transceiver 23. The memory 22 and the transceiver 23 are connected and communicating with a processor 21 via a bus. The memory 22 is configured to storing instructions, the transceiver 23 is configured to communicate with a further device, and the processor 21 is configured to execute instructions stored in the memory 22 to cause the electronic device 200 to perform the method as described in the first embodiment, where details are not described herein again.

The processor 21 may be a microcontroller unit (MCU), where the MCU is also called as a single chip microcomputer or a single chip microcomputer. The processor may also be a central process unit (CPU), a digital signal processor (DSP), an application specific integrated circuit (ASIC), a field programmable gate array (FPGA) or another programmable logic device, discrete gate or a transistor logic device.

The memory 22 can be implemented by any type of volatile or non-volatile memory device or a combination thereof, such as a static random access memory (SRAM), an electrically erasable programmable read only memory (EEPROM), an erasable programmable read only memory (EPROM), a programmable read only Memory (PROM), a read only memory (ROM), a magnetic memory, a flash memory, a disk or a compact disk.

The transceiver 23 can establish a wired or wireless communication link with other devices such that a smart device can access a wireless network based on a communication standard, such as WiFi, 2G or 3G, or a combination thereof. In an exemplary embodiment, the transceiver 23 further includes a near field communication (NFC) module to facilitate short range communications. For example, the NFC module can be implemented based on a radio frequency identification (RFID) technology, infrared data association (IrDA) technology, ultra-wideband (UWB) technology, bluetooth (BT) technology, and other technologies.

The bus may be an industry standard architecture (ISA) bus, a peripheral component (PCI) bus, or an extended industry standard architecture (EISA) bus. The bus can be divided into an address bus, a data bus, a control bus, and the like. For ease of representation, the bus in the drawings of the present disclosure is not limited to only one bus or one type of bus.

Embodiment 5 provides a computer readable storage medium, where the computer readable storage medium stores instructions that, when executed, cause the computer to implement the method as described in Embodiment 1.

At last, it should be noted that the above embodiments are merely illustrative of the technical solutions of the present disclosure, and are not intended to be limiting. Although the present disclosure has been described in detail with reference to the foregoing embodiments, those skilled in the art will understand that the technical solutions described in the foregoing embodiments may be modified, or that some or all of the technical features may be equivalently substituted; these modifications or substitutions do not deviate the nature of the corresponding technical solution from the scope of the technical solutions of various embodiments according to the present disclosure.

What is claimed is:

1. An image warping method, comprising:
   obtaining a video;
   identifying at least one target portion of a to-be-warped portrait in the video; and
   performing a warping process on the target portion using a preset warping algorithm, wherein the warping process comprises one or more of the following processes: enlarging, narrowing down, or shifting;
   wherein the identifying at least one target portion of a to-be-warped portrait in the video comprises:
   identifying the to-be-warped portrait in each frame or a key frame of the video;
   extracting contour points of the target portion of the to-be-warped portrait; and
   wherein the performing a warping process on the target portion using a preset warping algorithm comprises:
   performing the warping process using the preset warping algorithm on a region where the contour points of the target portion are located;
   wherein the method further comprises:
   performing a smoothing process on contour points of a same target portion extracted from continuous plurality of frames of image comprised in the video before performing the warping process using the preset warping algorithm on the region where the contour points of the target portion are located.

2. The method according to claim 1, wherein the identifying at least one target portion of a to-be-warped portrait in the video comprises:
   identifying the to-be-warped portrait in each frame or a key frame of the video; and
   dividing the to-be-warped portrait to obtain the target portion.

3. The method according to claim 1, wherein the performing a warping process on the target portion using a preset warping algorithm comprises:
   dividing the video into a two-dimensional grid;
   performing a warping calculation on pixel points located at vertices of the two-dimensional grid in the target portion by using the warping algorithm to obtain position information of the pixel points at the vertices of the two-dimensional grid after warping;
   performing, according to position information of the pixel points at the vertices of the two-dimensional grid before and after the warping, an interpolation calculation on other pixel points other than the pixel points at the vertices of the two-dimensional grid in the target portion to obtain position information of the other pixel points after the warping; and filling a position after the warping with a pixel value of each pixel point of the target portion.

4. The method according to claim 1, wherein when performing a process of narrowing down on the target portion in the image, the method further comprises:
separating a portrait and a background area in the image by using a background segmentation technology;
filling a blank area formed after the narrowing down of the target portion according to a pixel value of the background area; or performing a warping process on the background area using the warping algorithm to enlarge the background area, wherein the enlarged area is used to fill the blank area formed after the narrowing down of the target portion.

5. The method according to claim 1, wherein when performing a process of narrowing down on the target portion in the video, the method further comprises:
separating a portrait and a background area of each frame of image in the continuous plurality of frames of image comprised in the video by using a background segmentation technology;
filling a blank area formed after the narrowing down of the target portion according to a pixel value of the background area of the continuous plurality of frames of image; or performing a warping process on the background area of each frame of image using the warping algorithm to enlarge the background area of each frame of image, wherein the enlarged area is used to fill the blank area formed after the narrowing down of the target portion.

6. The method according to claim 1, wherein after the performing a warping process on the target portion using a preset warping algorithm, the method further comprises:
performing a smoothing process on a warping result of a same target portion in the continuous plurality of frames of image comprised in the video.

7. The method according to claim 1, wherein the obtaining a video comprises:
shooting the video using a camera; or
obtaining the video from a storage space.

8. An electronic device, comprising a processor, a memory and a transceiver, wherein the memory is configured to store instructions, the transceiver is configured to communicate with a further device, and the processor is configured to execute the instructions stored in the memory to cause the electronic device to:
obtain a video;
identify at least one target portion of a to-be-warped portrait in the video; and
perform a warping process on the target portion using a preset warping algorithm, wherein the warping process comprises one or more of the following processes: enlarging, narrowing down, or shifting;
wherein the processor is further configured to execute the instructions stored in the memory to cause the device to:
identify the to-be-warped portrait in each frame or a key frame of the video;
extract contour points of the target portion of the to-be-warped portrait;
perform a smoothing process on contour points of a same target portion extracted from continuous plurality of frames of image comprised in the video; and
perform the warping process using the preset warping algorithm on a region where the contour points of the target portion are located.

9. The device according to claim 8, wherein the processor is further configured to execute the instructions stored in the memory to cause the device to:
identify the to-be-warped portrait in each frame or a key frame of the video; and
divide the to-be-warped portrait to obtain the target portion.

10. The device according to claim 8, wherein the processor is further configured to execute the instructions stored in the memory to cause the device to:
divide the video into a two-dimensional grid;
perform a warping calculation on pixel points located at vertices of the two-dimensional grid in the target portion by using the warping algorithm to obtain position information of the pixel points at the vertices of the two-dimensional grid after warping;
perform, according to position information of the pixel points at the vertices of the two-dimensional grid before and after the warping, an interpolation calculation on other pixel points other than the pixel points at the vertices of the two-dimensional grid in the target portion to obtain position information of the other pixel points after the warping; and
fill a position after the warping with a pixel value of each pixel point of the target portion.

11. The device according to claim 8, wherein the processor is further configured to execute the instructions stored in the memory to cause the device to:
separate a portrait and a background area in the image by using a background segmentation technology when a process of narrowing down is performed by the device on the target portion in the image;
fill a blank area formed after the narrowing down of the target portion according to a pixel value of the background area; or perform a warping process on the background area using the warping algorithm to enlarge the background area, wherein the enlarged area is used to fill the blank area formed after the narrowing down of the target portion.

12. The device according to claim 8, wherein the processor is further configured to execute the instructions stored in the memory to cause the device to:
separate a portrait and a background area of each frame of image in the continuous plurality of frames of image comprised in the video by using a background segmentation technology when a process of narrowing down is performed by the device on the target portion in the video;
fill a blank area formed after the narrowing down of the target portion according to a pixel value of the background area of the continuous plurality of frames of image; or perform a warping process on the background area of each frame of image using the warping algorithm to enlarge the background area of each frame of image, wherein the enlarged area is used to fill the blank area formed after the narrowing down of the target portion.

13. The device according to claim 8, wherein the processor is further configured to execute the instructions stored in the memory to cause the device to:
perform a smoothing process on a warping result of a same target portion in the continuous plurality of frames of image comprised in the video.

14. The device according to claim 8, wherein the processor is further configured to execute the instructions stored in the memory to cause the device to:

shoot the video using a camera; or obtain the video from a storage space.

15. A non-transitory computer readable storage medium, wherein the non-transitory computer readable storage medium stores instructions that, when executed, cause a computer to perform the following steps:

obtaining a video;

identifying at least one target portion of a to-be-warped portrait in the video; and performing a warping process on the target portion using a preset warping algorithm, wherein the warping process comprises one or more of the following processes: enlarging, narrowing down, or shifting;

wherein the identifying at least one target portion of a to-be-warped portrait in the video comprises:

identifying the to-be-warped portrait in each frame or a key frame of the video;

extracting contour points of the target portion of the to-be-warped portrait; and wherein the performing a warping process on the target portion using a preset warping algorithm comprises:

performing the warping process using the preset warping algorithm on a region where the contour points of the target portion are located;

wherein the computer readable storage medium stores instructions that, when executed, further cause a computer to perform the following step:

performing a smoothing process on contour points of a same target portion extracted from continuous plurality of frames of image comprised in the video before performing the warping process using the preset warping algorithm on the region where the contour points of the target portion are located.

* * * * *